United States Patent [19]

Koehler

[11] 3,829,697

[45] Aug. 13, 1974

[54] INCREMENTALLY-ADJUSTABLE REGULATOR FOR NUCLEAR PULSE GENERATOR

[75] Inventor: Dale R. Koehler, Westwood, N.J.

[73] Assignee: Bulova Watch Company, Inc., New York, N.Y.

[22] Filed: May 18, 1972

[21] Appl. No.: 254,476

[52] U.S. Cl............................... 250/370, 250/252
[51] Int. Cl................................................ G01t 1/15
[58] Field of Search ........... 250/252, 366, 367, 370, 250/371, 374, 375; 313/93; 136/202; 58/23 C

[56] References Cited
UNITED STATES PATENTS

| | | | |
|---|---|---|---|
| 3,569,711 | 3/1971 | Stoms et al. | 250/375 |
| 3,629,582 | 12/1971 | Koehler et al. | 250/363 |

Primary Examiner—James W. Lawrence
Assistant Examiner—Davis L. Willis

[57] ABSTRACT

A nuclear pulse generator constituted by a source of radioactive material and a solid-state detector for sensing particles emitted by the source to produce corresponding output pulses. In order to regulate the count rate of pulses yielded by the generator, a section of the active detector surface is divided into a series of physically and electrically separated segments, each of which is connected to a common output terminal through a respective switch. By selective electrical connection of the detection segments, one can dictate whether or not the segments are counting. The ratio of the segment areas to each other is a binary number. The area of the smallest segment in the binary series to the total detection area is the desired resolution of the system, whereas the ratio of the sum of the segment areas to the total detection area corresponds to the range of regulation.

10 Claims, 4 Drawing Figures

INCREMENTALLY-ADJUSTABLE REGULATOR FOR NUCLEAR PULSE GENERATOR

BACKGROUND OF INVENTION

This invention relates generally to nuclear pulse generators constituted by a source of radioactive material emitting charged particles which are sensed by a solid-state radiation detector to produce electrical pulses, and more particularly to a pulse count regulator for such generators.

A number of practical applications exists for nuclear pulse generators. For example, in nuclear gauges, a source of radioactive material emits particles that are sensed by a detector, a sheet of material to be measured being interposed between the source and the detector, whereby the number of particles detected is a function of the thickness of the sheet.

Another use for a nuclear pulse detector is as a time base for a clock or watch, as disclosed, for example, in the Lazrus, et al. U.S. Pat. No. 3,370,414, and in the Koehler, et al. U.S. Pat. No. 3,629,582. Though the present invention will be described in the context of nuclear time bases for timepieces, it is to be understood that it is applicable to all situations calling for the pulse count regulation of a nuclear pulse generator.

In the Koehler, et al. patent, there is disclosed a timepiece arrangement in which a radioactive source having a relatively long half-life, emits charged particles which are sensed by a solid-state radiation detector. The detector yields a relatively large number of electrical pulses per second, the pulses being scaled down by electronic pulse frequency dividers to produce a relatively low number of control pulses in the same period, such as one per minute. The control pulses are applied to an electronic or electromechanical time register to actuate or control the register to indicate time. The combination of the radioactive source and detector is designated a timekeeping standard or time base, as distinguished from the associated pulse scaling and indicating stages.

Although nuclear disintegrations are distributed randomly in time, timing accuracy can be obtained through the accumulation of a sufficient number of counts. Since these disintegrations obey the Poisson distribution in accordance with probability theory, one can calculate the statistical accuracy that can be expected from a total number of counts, assuming that the counting system contributes negligible error.

As pointed out in the Koehler, et al. patent, the preferred form of radioactive source for the timekeeping standard is an isotope which emits alpha particles and has a prolonged half-life. While gamma rays are radiated with discrete energies, and in that respect are nearly monoenergetic and can be used for timing purposes, they are a highly penetrating form of radiation; hence it would not be feasible, within the confines of a watch or small timepiece, to provide the necessary protective shielding.

The Lazrus patent also discloses a timepiece using a nuclear time base, but in this instance, beta particle rather than alpha particle radiation is employed. The actual number of pulses at the input of the scaler in the Koehler, et al. or in the Lazrus, et al. system necessary to produce an output pulse is determined by calibrating the timekeeping system.

Calibration of the timekeeping system depends on a determination of the mean counting rate. For nuclear alpha radiation, the solid-state detector has a 100 percent detection efficiency for those particles striking the detector; hence it is necessary only to specify the mean source rate. The simplest technique is to prepare by chemical means or otherwise a given source mass. One may for example weigh out a predetermined amount of radioactive material in that the number of radioactive atoms decaying per minute is proportional to the number of atoms present. Accordingly, a given source mass gives rise to a given source activity to provide a pre-chosen rate or count per minute to correspond to the stepping time interval of the clock.

Another approach which is in some respects more practical is to begin with an approximately correct amount of the material, and then, having determined the existing count rate, to increase or decrease the effective area of the radioactive source seen by the detector by means of an adjustable mask. The control of the mask would require the same order of accuracy as that desired of the system. For this purpose, the mask may be in the form of an adjustable shutter whose position is varied with respect to the radioactive source by a Vernier screw arrangement to more or less block the path between the source and the detector.

The use of a mechanically-controlled shutter to regulate the timing has certain drawbacks in the context of a miniature timepiece or watch movement. A vernier mask movement to obtain fine control of the pulse rate is not only costly, but it is also quite difficult to incorporate within the confines of a watch movement.

The Koehler, et al. patent also suggest an electronic calibration technique in which one first determines the actual count rate of an approximately weighted source and then adjusts the scale-down or ratio value of a binary scaler system coupled to the source to produce the desired low pulse rate. The practical objection to this arrangement is that scaler calibration circuits add materially to the overall cost and complexity of the system, for in order to use such circuits in the confines of a watch, highly sophisticated and relatively expensive integrated circuit technology is entailed.

SUMMARY OF INVENTION

In view of the foregoing, it is the main object of this invention to provide a pulse count regulator for a nuclear pulse generator which overcomes the drawbacks of prior art devices for this purpose and which affords a simple, reliable and low cost means to effect such regulation.

More particularly, it is an object of the invention to provide a pulse count regulator of the above type, which is incrementally adjustable throughout a relatively broad range.

Also an object of the invention is to provide a highly compact, incrementally adjustable, nuclear pulse generator which may be incorporated into a miniature timepiece or watch and which may be readily adjusted without the need for special tools.

Briefly stated, these objects are accomplished in a nuclear pulse generator constituted by a source of radioactive material which irradiates a solid-state detector, the active surface of the detector being divided into a main detection area and a section composed of a series of electrically-separated segments, the ratio of the segment areas to each other being a binary number.

Switching means are provided to connect each segment to an output terminal to which the main detection area is permanently connected. The ratio of the area of the smallest segment in the binary series to the total detection area composed of all segments together with the main detection area, is the desired resolution of the system, whereas the ratio of the sum of the segment areas to the total detection area corresponds to the range of regulation.

OUTLINE OF DRAWING

For a better understanding of the invention as well as other objects and features thereof, reference is made to the following detailed description to be read in conjunction with the accompanying drawing wherein:

FIG. 3 is a perspective view of a preferred embodiment of the pulse generator.

DESCRIPTION OF INVENTION

Figure 1:
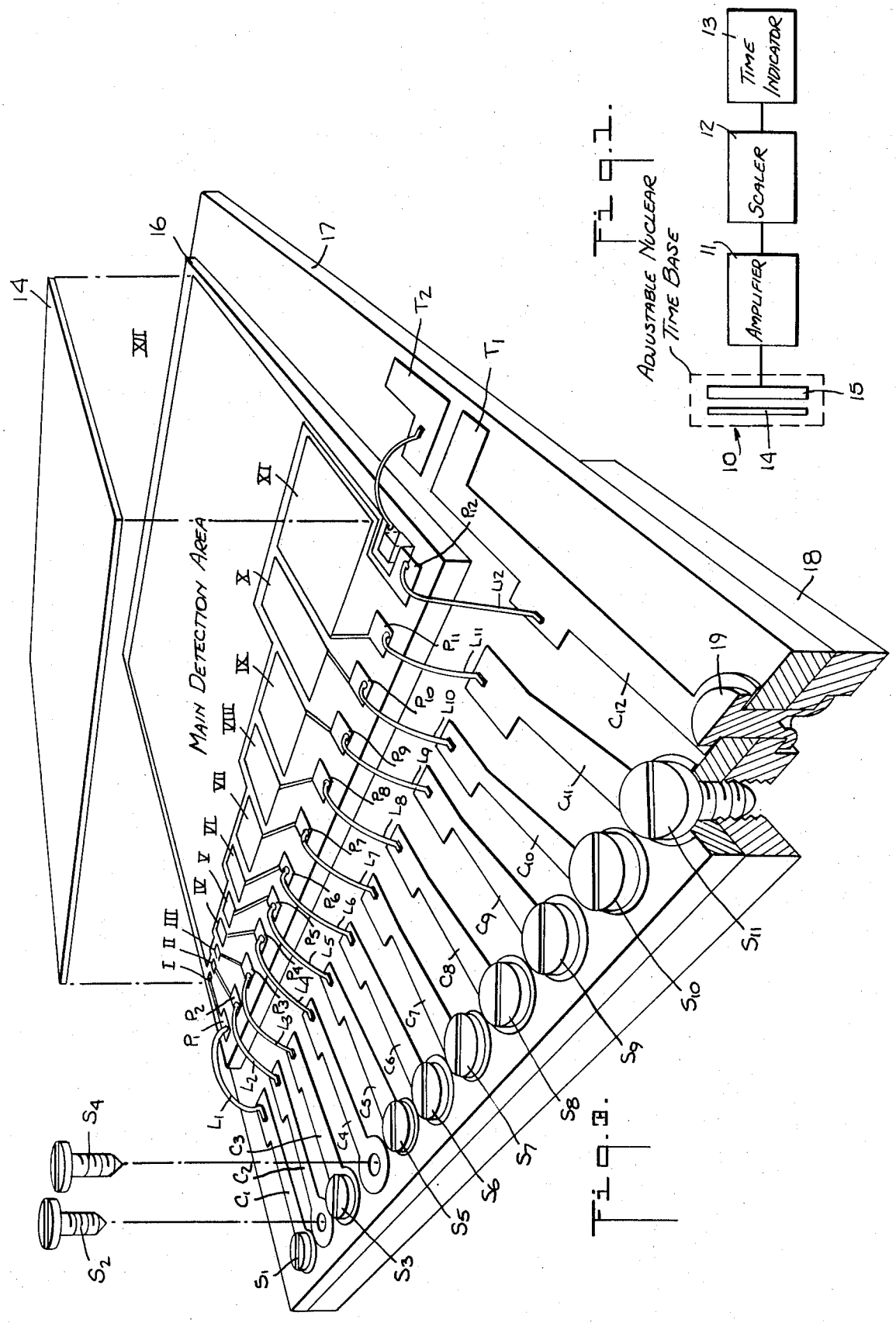
FIG. 1 is a block diagram of an electronic timepiece that includes a nuclear pulse generator having a pulse count regulator in accordance with the invention.

Referring now to FIG. 1, there is shown a timepiece, generally of the type disclosed in said Koehler, et al. patent and incorporating an adjustable nuclear time base 10 in accordance with the invention. The pulsatory output of the time base is applied to an amplifier 11 to produce amplified pulses that are scaled-down in an electronic divider or scaler 12 of conventional design to produce low-frequency pulses at a rate suitable for the time display indicator 13, which may be of any known electromechanical or electronic design.

Timekeeping standard 10 is constituted by a radioactive mass 14 of predetermined weight, preferably deposited onto the face of a solid state detector 15, which in turn produces electrical impulses corresponding in number to the particles emitted by the mass. This radioactive source may for example be Plutonium-242 with a half-life of $3.79(10)^5$ years or Uranium-233 with a half-life of $1.62(10)^5$ years.

Preferably the source is Neptunium-237 with a half-life of $2.2(10)^6$ years. With this radioactive material, the change in the emission rate at the end of the year would be one part in $3.1(10)^6$. Thus the frequency standard would be effectively invariant with time to a degree corresponding to an accuracy for the system of the order of one part in $10^6$.

Solid state detector 15 may be of the diffused junction or of the silicon surface barrier type, these being extremely high resolution devices. That is, the uncertainty in the signal pulse $\Delta\nu$ divided by the magnitude of the signal pulse $\nu$ is less than 1 percent, and the signal magnitude itself is two orders of magnitude greater than the noise level (e.g., for natural radioactive alpha emitters).

In the solid-state detector, an electrical field is set up across a semiconducting medium of low electrical conductivity. Usually the low conductivity region is the charge depletion region in a semiconductor diode operating at reverse bias. The thickness, or width, of this depletion region is a function of the voltage across the junction, to the one-half power. This voltage is the sum of the built-in potential difference existing across the junction interface, arising from the formation of a space charge related to the relative density of the holes on the two sides of the junction, and the applied (external) reverse bias.

Typical values of this built-in-potential difference are of the order of 0.5 volt. When a charged particle passes through the semiconductor, electron hole pairs are produced therein. The charges are caused to separate by the electric field, and the resultant signal in the output of the detector reflects the presence and energy of the impinging particle.

For a more detailed discussion of semiconductive radiation detectors, reference is made to "Nuclear Radiation Detection" by W. J. Price—McGraw-Hill Book Co., Inc., 1964. In addition to high resolution, these detectors have other important properties including linearity of pulse height vs. energy, and very rapid response time as well as insensitivity to magnetic fields.

In the foregoing general description, we have assumed a radioactive source producing a predictable number of particles within a unit of time. This assumption makes it possible to predetermine the scale-down value for producing the correct rate of low frequency pulses for operating the time display. However, as pointed out previously, as a practical matter it is difficult to provide the exact weight of radioactive material necessary to support the above assumption.

Hence, the pulse count regulator in accordance with the present invention makes possible an adjustment of the number of pulses produced by the nuclear generator in a unit period to provide a pulse rate appropriate for a divider which has a fixed scale-down value. This, in a practical embodiment of the invention, the scaler circuit has a predetermined scale-down value, whereas the time base associated therewith is adjustable to supply incoming pulses to the scaler at a high rate providing output pulses at the desired low rate.

In considering a nuclear pulse generator or time base constituted by a radioactive source operating in conjunction with a solid state detector, let us assume the absence of collimating apertures so that the source effectively "sees" the entire surface of the detector.

The observed count rate is influenced by several factors, one of which is the reception geometry establishing the number of particles emanating from the source and the number of particles striking the detector surface. Either of these numbers can be varied; that is, one may alter the emitting area of the source or the area of the particle-receiving detector. Moreover, the proximity of the source to the detector may be varied, or the source may be deposited directly onto the face of the detector, in which event there will be no gap therebetween.

In the present invention, an adjustment in the output of the nuclear pulse generator is effected by varying the effective area of the detector. This is accomplished by dividing a section on the face of the detector into a series of physically and electrically separated segments, whose areas are all different. Since the area of each segment determines, in a linear fashion, its contribution to the total counting rate, one achieves direct linear control of this counting rate by switching means that selectively connect the several segments to the output terminal of the generator. By selective electrical connection of the segments composing the detection section, one can dictate whether or not the segments are counting.

Figure 2:
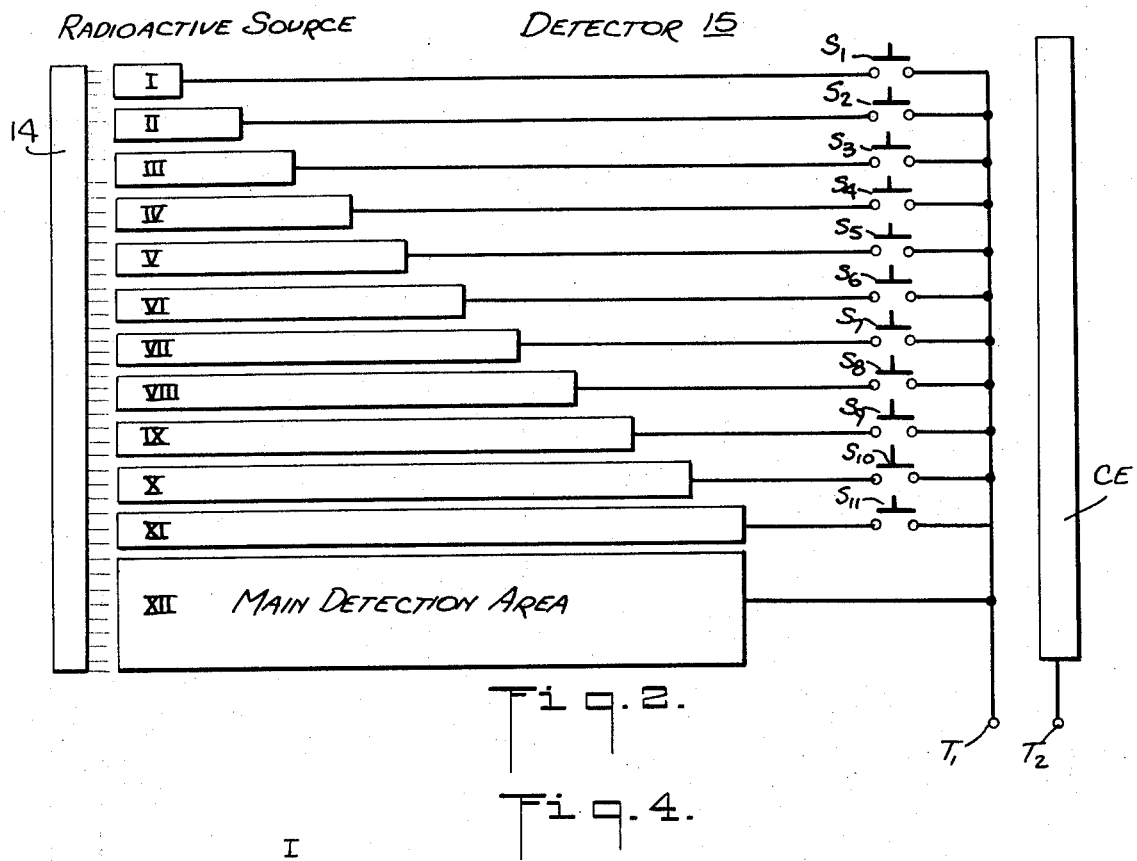
FIG. 2 is a schematic circuit diagram of the pulse generator.

Referring now to FIG. 2, the manner in which the pulse count of the nuclear pulse generator is regulated is illustrated schematically. The face of the detector 5 which is irradiated by source 14 is divided to provide a main area designated by Roman numeral XII and a smaller section composed of eleven segments I to XI of progressively larger size. Segment I is the smallest segment and is hereafter referred to as the minor segment, while segment XI, which is the largest, is referred to as the major segment.

Minor segment I is connected by a switch $S_1$ to output terminal $T_1$ and major segment XI is connected to the same terminal by switch $S_{11}$. The intermediate segments are connected to this terminal by switches $S_2$ to $S_{10}$, respectively. Main detection area XII is directly connected to output terminal $T_1$ and is therefore always active. The second output terminal $T_2$ is connected to the back electrode CE of the solid state detector 15, which back electrode is common to the entire active area.

Thus when all switches $S_1$ to $S_{11}$ are closed, all segments in the series thereof are active and these areas are combined with the area of the main detection area XII to provide output pulses whose count rate depends on the number of particles striking all areas of the detector. But when switch $S_1$ is open, minor segment I is disconnected and the pulses yielded thereby are deducted from the output count rate.

A further deduction is effected by opening switch $S_2$ and so on. It is assumed that the number of particles striking the detection surface is uniformly distributed thereover and that the detection area is therefore related in a linear fashion to the output count rate.

A significant feature of the present invention is that the segmented pattern of the detection area surface is such that the ratio of the segment areas to each other is a binary number. The area of minor segment I is made such that the ratio of its area to the total detection area composed of segments I to XI together with the main detection area XII is the desired resolution of the pulse regulation system, whereas the ratio of the sum of the segment areas (I to XI) to the total detection area (I to XI plus XII) corresponds to the range of regulation.

Figure 4:
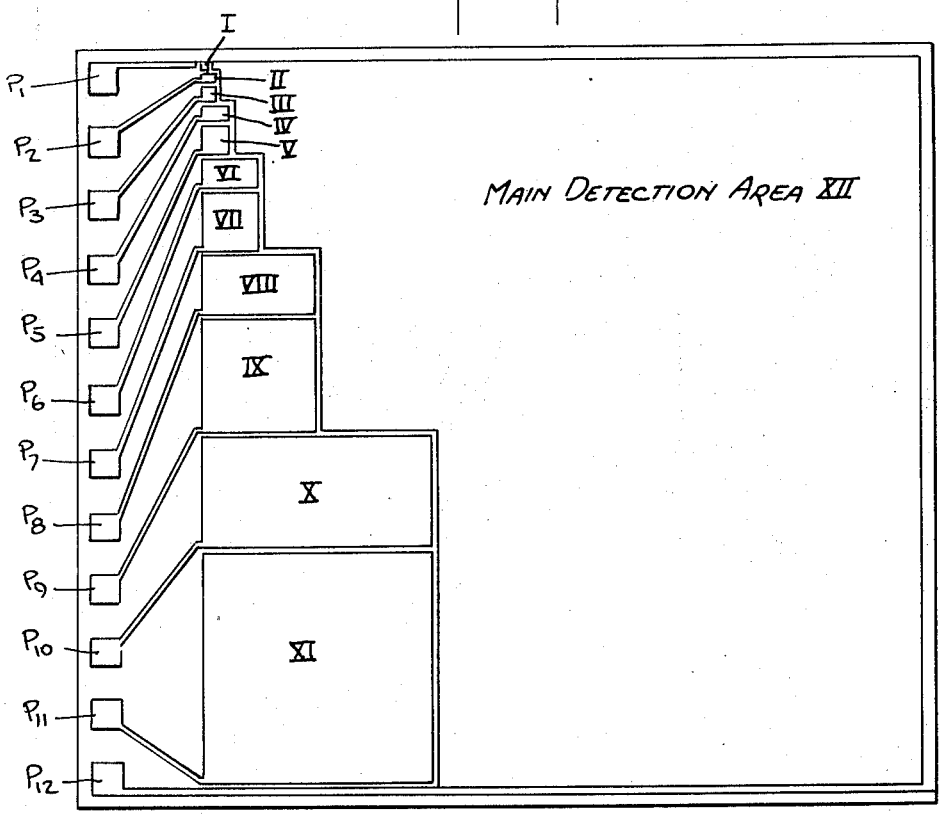
FIG. 4 is a plan view of the detector portion of the pulse generator.

FIGS. 3 and 4 show one preferred embodiment of an adjustable nuclear pulse generator in which the detector segments I to XI and main detection area XII together produce, with a given radioactive source, a total count of one million pulses per minute (PPM).

By this embodiment, the area of minor segment I is one-ten thousandths of the total detection area and therefore corresponds to 100 PPM. The segment areas I to XI bear a binary relationship to each other. Hence, in the table below, the binary number of each segment I to XI is given as well as the number of counts per minute yielded by each segment.

| Segment | Binary Number | Pulse Count (PPM) |
|---|---|---|
| I | 1 | 100 |
| II | 2 | 200 |
| III | 4 | 400 |
| IV | 8 | 800 |
| V | 16 | 1,600 |
| VI | 32 | 3,200 |
| VII | 64 | 6,400 |
| VIII | 128 | 12,800 |
| IX | 256 | 25,600 |
| X | 512 | 51,200 |
| XI | 1,024 | 102,400 |
| Total: I to XI | 2,047 | 204,700 |

Thus again assuming that the total count for the detection area formed by the sum of segments I to XI together with main area XII is one million PPM, by switching out only minor segment I, the count rate is then decreased by 100 PPM, which is the resolution of system. Incremental changes in the count rate in successive steps of 100 PPM may be effected by selective operation of switches $S_1$ to $S_{11}$ as shown in the table below for the first 11 steps in the range.

| Step | Count Deduction (PPM) | Switch Openings |
|---|---|---|
| 1 | 100 | $S_1$ to delete segment I |
| 2 | 200 | $S_2$ to delete segment II |
| 3 | 300 | $S_1$ and $S_2$ to delete I and II |
| 4 | 400 | $S_3$ to delete III |
| 5 | 500 | $S_1$ and $S_3$ to delete I and III |
| 6 | 600 | $S_2$ and $S_3$ to delete II and III |
| 7 | 700 | $S_1$, $S_2$ and $S_3$ to delete I, II and III |
| 8 | 800 | $S_4$ to delete IV |
| 9 | 900 | $S_1$ and $S_4$ to delete I and IV |
| 10 | 1,000 | $S_2$ and $S_4$ to delete II and IV |
| 11 | 1,100 | $S_1$, $S_2$ and $S_4$ to delete I, II and IV |

By selective operation of switches $S_1$ to $S_{11}$, one may deduct in 2,047 incremental steps of 100 PPM each, a maximum of 204,700 counts per minute which is the sum of the counts yielded by segments I to XI. In a count rate of 1 million radioactive particles incident to the total detection area (I to XII), the range of control which extends in 100 PPM steps from 100 to 204,700 PPM is about 20 percent. Thus in this embodiment of a segmented detector, the resolution is 100 PPM and the range about 20 percent.

Because it is possible with only 11 switches and 11 segments in the detector section to effect a large succession of incremental changes in count rate throughout a broad range, the segmented detector in which the segments bear a binary relation to one another is a highly efficient and compact adjustable nuclear pulse generator.

It is to be understood, however, that an 11-segment-arrangement is only by way of example, and that in practice, a greater or smaller number of segments may be used, as long as they bear a binary relationship to each other. Because of the binary pattern, a broad range of regulation is effected using the least number of switches and segments. This is of practical importance in the context of a watch or other miniature device, for it is now feasible to effect the desired degree of pulse count regulation with relatively few parts in a highly compact structure.

The actual structure by which this is accomplished is shown in FIGS. 3 and 4, where it will be seen that the detection segments I to XI in a binary ratio series and the main detection area XII together compose a rectangle whose overall area represents the total detection area. The pattern of segmentation is such that each of segments I to XI is also a rectangle which occupies an indentation in the main detection area XII to minimize the loss of active space in the separation between segments and the main detection area.

Segments I to XI and main detection area XII are formed on a detector chip 16 which in turn is supported on a larger rectangular insulating substrate 17. Overlying segments I to XI and main area XII, is the radioactive source 14 which is in the form of a plate having radioactive material deposited thereon.

The assumption of uniform irradiation of the detection surface is best accomplished by a source-detection relationship approaching a $2\pi$ geometry—that is with the source in intimate contact with the detection surface, the source area being equal to or greater than the detector area so that all portions of the detector surface are irradiated.

The detector-source geometry need not preclude the use of a mask, although the minimum detector segment size imposes some limitations on mask aperturing. Where, however, the source is deposited directly onto the face of the detector, a mask cannot be used.

Switches $S_1$ to $S_{11}$ for selectively connecting segments I to XI to output terminal $T_1$ on substrate 17 take the form of screws that pass through holes in the substrate and are threadably received in a common metal base 18 mounted in the underside of the substrate and connected to one output terminal $T_1$.

In order to connect segments I to XI to their associated switches, the segments are connected respectively by printed circuit conductive lines on the face of detector chip 16 to terminal pads $P_1$ to $P_{11}$. These pads are connected by leads $L_1$ to $L_{11}$ to connector strips $C_1$ to $C_{11}$ formed on the upper face of substrate 17. The ends of strips $C_1$ to $C_{11}$ take the form of lugs which are engaged by the heads of switching screws $S_1$ to $S_{11}$.

Hence when screw $S_1$ is fully inserted in the common metal base 18, it completes a connection between segment I and output terminal $T_1$. Similarly screws $S_2$ to $S_{11}$ complete connections between segments II to XI and output terminal $T_1$. The main detection area XII is connected on chip 16 to a pad $P_{12}$ which is connected by a lead $L_{12}$ to strip $C_{12}$, one end of which goes to terminal $T_1$, the other end being connected by a rivet 19 to metal base 18. Thus the main detection area XII is permanently connected to output terminal $T_1$.

Thus the structure of the nuclear pulse generator is in the form of a highly compact slab with a row of exposed switching screws which may be selectively turned in or out to adjust the count rate of the generator.

While there has been shown a preferred embodiment of the invention, it will be appreciated that many changes and modifications may be made therein without departing from the essential spirit of the invention as defined in the annexed claims.

I claim:

1. An adjustable nuclear pulse generator comprising:
   a. A source of radioactive material,
   b. a solid-state detector having an active surface exposed to said source, said surface being positioned relative to said source whereby it is substantially uniformly irradiated thereby, a section of said surface being divided into a series of segments which are physically and electrically separated from each other and from the main detection area of said surface, said segments having different areas, and
   c. means including respective switches connected to each segment to connect said segments to an output terminal, said main detection area being permanently connected to said output terminal, whereby by selective electrical connection of the segments one can dictate whether or not the segments are counting, the total counting rate of the generator being determined by the contribution of the main detection area and the contributions of those segments which are connected to the output terminal.

2. A generator as set forth in claim 1, wherein the ratio of the segment areas to each other is a binary number.

3. A generator as set forth in claim 2, wherein the ratio of the area of the smallest segment in the binary series to the total detection area composed of all the segments together with said main detection area is the desired resolution of the pulse regulation system.

4. A generator as set forth in claim 3, wherein the ratio of the sum of said segment areas to the total detection area represents the range of adjustment.

5. A generator as set forth in claim 2, wherein the active surface of the detector has a rectangular form that is divided to produce a binary series of segments each of which is rectangular in form and nests within an indentation in the main detection area.

6. A generator as set forth in claim 1, wherein said switches are constituted by a row of screws, each of which is connected to a respective segment, the screws being threadably receivable within a common metal plate connected to said output terminal.

7. A generator as set forth in claim 1, wherein said segments and said main detection area are formed on the top face of a solid state chip having a common electrode on the back face thereof, said common electrode being connected to a second output terminal.

8. A generator as set forth in claim 1, wherein said source of radioactive material is in the form of a plate in intimate contact with said active surface of the detector.

9. A generator as set forth in claim 1, wherein said source material is deposited directly on the active surface of the detector.

10. A generator as set forth in claim 1, wherein said detector is of the diffused junction type.

* * * * *